Oct. 29, 1963   K. NURMSE   3,108,760
SPINNING REEL
Filed Aug. 24, 1959
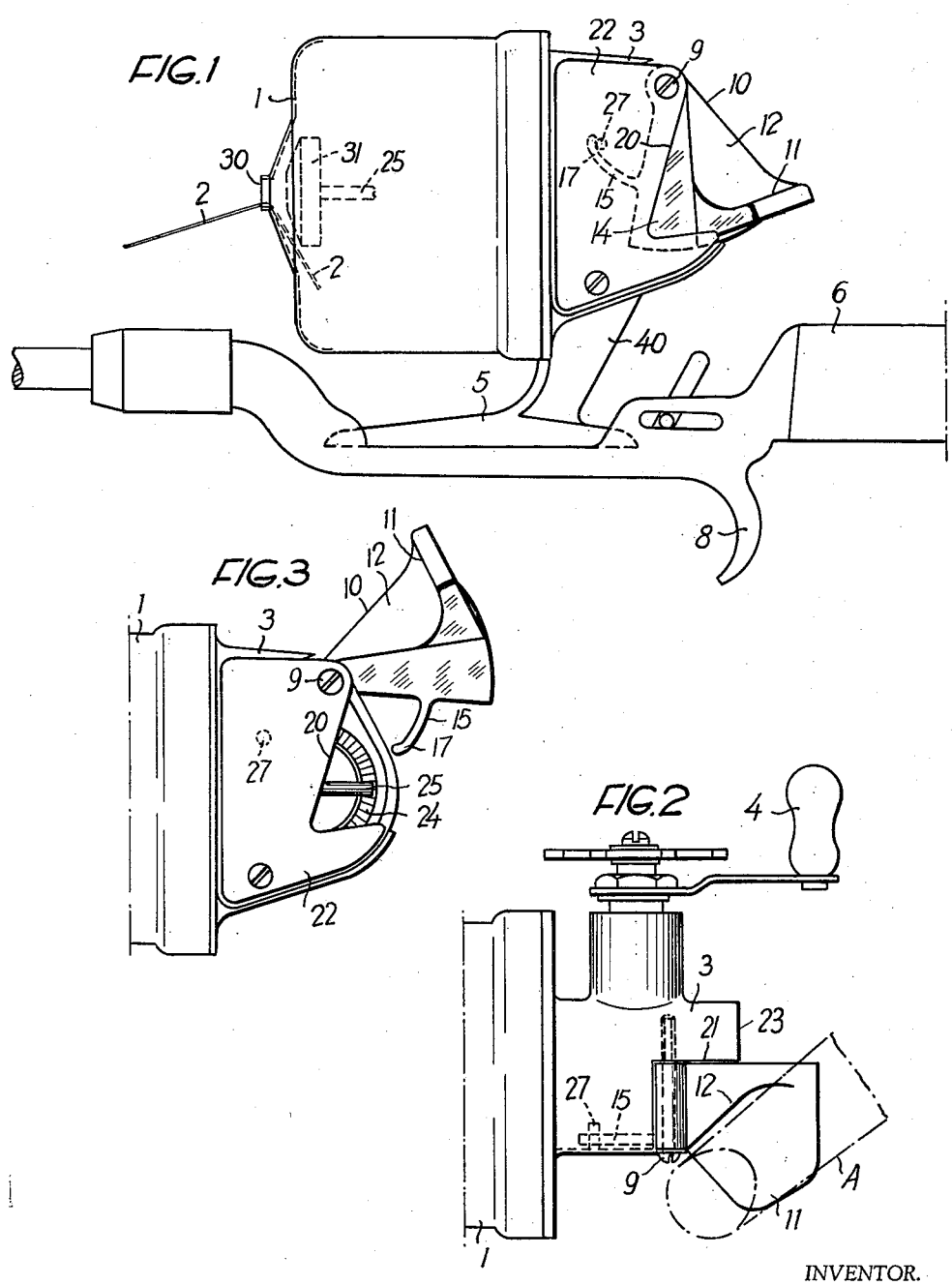
INVENTOR.
BY United States Patent Office 3,108,760
Patented Oct. 29, 1963

3,108,760
SPINNING REEL
Karl Nurmse, Svangsta, Sweden, assignor to Aktiebolaget Urfabriken, Svangsta, Sweden, a corporation of Sweden
Filed Aug. 24, 1959, Ser. No. 835,576
Claims priority, application Sweden Aug. 26, 1958
10 Claims. (Cl. 242—84.2)

This invention relates to a spinning reel having at its rear end a thumb piece which when depressed actuates a drag mechanism for the fishing line. In its broadest aspect, the invention is characterized in that the thumb piece comprises a rest for the lower side of the thumb, at least the major part of said rest as viewed in the casting direction being located on one side of the central longitudinal vertical plane of the reel with the reel in the position which it assumes when located above a casting rod. The thumb piece may further comprise a rest for the inner side of the thumb, the last named rest being located close to said vertical plane.

The invention is described more closely hereinbelow with reference to an embodiment thereof illustrated in the accompanying drawing.

FIG. 1 is a side elevation of a spinning reel fastened to a casting rod and provided with a thumb piece according to the invention, FIG. 2 part of a top view of the reel, and FIG. 3 part of a view similar to FIG. 1 with the thumb piece turned upwards.

Referring to the drawing, reference numeral 1 denotes a reel cover which houses means for spooling a fishing line 2 passing through an opening 30 onto and off a line spool. The line spooling device may be of any suitable type and forms no part of the invention and need not be described to be understood by those skilled in the art.

The reel cover 1 is connected to a housing 3 in which the operating crank 4 is mounted. The housing 3 is supported by a stem portion 40 having a tang 5 by means of which the reel is connected with the casting rod the handle of which is indicated at 6. Numeral 8 denotes a finger grip for the hand which holds the handle 6.

Pivotally mounted on a pin 9 in the housing 3 is a thumb piece 10 the configuration of which is the object of the invention. When the thumb piece is moved forward around the pin 9, an actuating shaft 25 is urged forwardly to the left as viewed in FIG. 1. The shaft 25 is connected to a drag member 31 which upon forward movement of the shaft acts to force the line 2 into contact with the wall of the cover 1 to check the motion of the line. The drag mechanism, too, may be of any suitable type and need not be described in detail.

In accordance to the invention the thumb piece 10 is shaped particularly for the purpose of rendering its manipulation as convenient as possible. The thumb piece 10 comprises a rest 11 for the lower side of the thumb of the hand which holds the handle 6. When the reel is located right above the casting rod, as shown in FIG. 1, the rest 11 is approximately horizontal. As will be seen from FIG. 2, the rest 11 is located on the left side of the central longitudinal vertical plane of the reel. The rest 11 merges into a rest 12 for the inner side of the thumb, the rests 11 and 12 being located substantially at right angles to each other. As shown in FIG. 2, the rest 12 extends obliquely forwardly and outwardly with respect to the above named vertical plane so as to provide for a convenient oblique position of the thumb relative to the longitudinal direction of the handle. In FIG. 2, a thumb is indicated by chain-dotted lines A. The rests 10, 11 are formed in a block which has plane side faces and consists of a suitable synthetic material. The side wall 22 and the rear or end wall 23 of the housing 3 have recesses 20 and 21, respectively, which receive the thumb piece 10 in the normal position thereof shown in FIGS. 1 and 2. The thumb piece which thus forms a side portion of the housing can be swung upwards from its normal position into the position shown in FIG. 3 in which it exposes the interior of the housing to render the parts within the housing, such as the pinion 24, accessible for inspection and lubrication.

To prevent the thumb piece from being swung unintentionally from the normal position according to FIG. 1 to the open position shown in FIG. 3, a resilient locking device is provided between the thumb piece and the housing. The locking device should prevent unintentional opening movement, but should not hinder the thumb piece from being moved to the drag position. The thumb piece 10 is connected with a locking arm 14 comprising an arcuate portion 15 the centre of curvature of which coincides with the axis of the pin 9. The outer end of the portion 15 has a rounded snap portion 17 which when the thumb piece 10 is moved forward is engaged by a stationary abutment 27 which may be a cross pin in the housing 3. The thumb piece consists suitably of a slightly resilient material, such as synthetic resin, and the parts 15 and 17 may be integral with the thumb piece as shown in the drawing.

The thumb rest 12 need not be exactly vertical, since its primary purpose is to facilitate correct positioning of the thumb on the rest 11. In the embodiment illustrated, the rest 11 for the lower side of the thumb is located on the left side of the central longitudinal vertical plane of the reel and consequently fits a right-handed person. It will be obvious that the rest 11 may be located to the right of said vertical plane in a reel for use by left-handed persons.

What I claim is:

1. In a fishing reel having a housing containing a line drag actuator, an aperture formed in said housing permitting access into said housing, a manually engageable piece pivotally mounted on said housing and normally positioned to close said aperture, said piece being swingable in one direction about said pivot to engage said actuator through said aperture and being swingable in the opposite direction to open or expose said aperture, said piece having a flexible latch member extending in a direction of movement of said piece and being formed with an arcuate portion centered about the pivotal point of said pivotally mounted piece and a terminal latching portion, a stationary abutment on said reel positioned to engage said latch portion of said latch member to restrict movement in one direction whereby said piece may swing unrestricted about its pivot the arcuate extent of said arcuate portion and may selectively swing farther only upon flexure of said latch member to pass said latch portion past said stationary abutment, whereby said piece may selectively actuate said drag actuator and permit convenient access into said housing.

2. A fishing reel as defined in claim 1 wherein the said piece is constructed and arranged to have a rest portion for the underside of a thumb spaced from and inclined toward the longitudinal center line of said reel.

3. A fishing reel as defined in claim 2 wherein the rest portion of said piece includes a rest for the side of the thumb toward said longitudinal center line.

4. In a fishing reel having a housing containing an actuator, an aperture formed in said housing permitting access into said housing, a manually engageable piece swingably mounted on said housing and normally positioned to close said aperture, said piece being swingable in one direction to engage said actuator through said aperture and being swingable in the opposite direction to open or expose said aperture, said piece having a releasable latch member and having a latching portion, a stationary abutment on said reel positioned to engage said latch portion of said latch member to restrict movement in one direction, whereby said piece may swing unrestricted an arcuate extent limited by said latch portion and may selectively swing farther only upon flexure of said latch member to pass said latch portion past said stationary abutment whereby said piece may selectively actuate said actuator and permit convenient access into said housing.

5. In a fishing reel having a housing containing an actuator, said housing having adjoining end and side walls, communicating apertures formed in said adjoining walls permitting access into said housing, a manually engageable piece swingably mounted on said housing and normally positioned to close said apertures, said piece being formed with a side wall portion closing said aperture in said side wall and an end wall portion closing said aperture in said end wall, said piece being swingable in one direction to engage said actuator through said apertures and being freely swingable in the opposite direction to open or expose said apertures whereby said piece may selectively actuate said actuator and permit convenient access into said housing.

6. A fishing reel as defined in claim 5 wherein the said piece is constructed and arranged to have a rest portion for the underside of a thumb spaced from and inclined toward the longitudinal center line of said reel.

7. A fishing reel as defined in claim 6 wherein the rest portion of said piece includes a rest for the side of the thumb toward said longitudinal center line.

8. In a fishing reel having a housing containing an actuator, an aperture formed in said housing permitting substantial finger access into said housing, a manually engageable piece pivotally mounted on said housing and normally positioned to close said aperture, said piece being formed with at least one side wall portion closing said aperture in each of several positions of said piece about its pivotal mounting, said piece being swingable in one direction about its pivot to engage said actuator through said aperture and being freely swingable in the opposite direction to substantially fully open or expose said aperture whereby said piece may selectively actuate said drag actuator and permit convenient access into said housing.

9. In a fishing reel having a housing containing an actuator, an aperture formed in said housing permitting access thereto, a manually engageable piece swingably mounted on said housing and normally positioned to close said aperture, said piece when swung about its mounting in one direction actuatingly engaging said actuator and in the opposite direction exposing said aperture, said piece being constructed and arranged to substantially close said aperture during a predetermined arc of swing in said opposite direction and a releasable detent positioned to limit the swing of said piece to said predetermined arc, whereby said piece may selectively actuate said drag actuator and upon selective release of said detent said piece being swingable in said opposite direction beyond said predetermined arc to permit convenient access into said housing.

10. In a fishing reel having a housing containing an actuator, an aperture formed in said housing permitting access thereto, a manually engageable piece pivotally mounted on said housing and normally positioned to close said aperture, said piece being operative to swing in one direction to engage said actuator and in the opposite direction to expose said aperture normally closed thereby and a releasable detent to selectively limit said piece against said last named movement in said opposite direction said piece being swingable in said one direction to engage said actuator and upon release of said releasable detent being swingable in said opposite direction to permit convenient access into said housing.

References Cited in the file of this patent

UNITED STATES PATENTS

| | | | |
|---|---|---|---|
| D. 185,730 | Beger | | July 28, 1959 |
| 2,159,527 | King | | May 23, 1939 |
| 2,507,457 | Rix | | May 9, 1950 |
| 2,668,025 | Hull | | Feb. 2, 1954 |
| 2,675,192 | Hull | | Apr. 13, 1954 |
| 2,862,679 | Denison et al. | | Dec. 2, 1958 |
| 2,903,202 | Sarah | | Sept. 8, 1959 |
| 2,991,957 | Hull | | July 11, 1961 |